United States Patent [19]
Behymer

[11] 3,848,457
[45] Nov. 19, 1974

[54] GASEOUS FLUID MONITORING APPARATUS

[75] Inventor: Donald James Behymer, Stillwater, Minn.

[73] Assignee: Minnesota Mining and Manufacturing Company, St. Paul, Minn.

[22] Filed: May 14, 1973

[21] Appl. No.: 360,104

[52] U.S. Cl. .................................... 73/24
[51] Int. Cl. .......................... G01n 31/00
[58] Field of Search............. 73/24, 23, 27 R, 67.2, 73/67.9, 69

[56] References Cited
UNITED STATES PATENTS

| | | | |
|---|---|---|---|
| 3,120,750 | 2/1964 | Root | 73/24 |
| 3,144,762 | 8/1964 | Testerman et al. | 73/24 X |
| 3,346,065 | 10/1967 | Bourquard | 73/24 X |
| 3,468,157 | 9/1969 | Burk et al. | 73/24 |
| 3,634,757 | 1/1972 | Monomakhoff | 73/27 R X |

FOREIGN PATENTS OR APPLICATIONS

| | | | |
|---|---|---|---|
| 784,146 | 10/1957 | Great Britain | 73/24 |
| 798,323 | 7/1958 | Great Britain | 73/24 |
| 805,544 | 12/1958 | Great Britain | 73/24 |

Primary Examiner—Richard C. Queisser
Assistant Examiner—Stephen A. Kreitman
Attorney, Agent, or Firm—Alexander, Sell, Steldt & Delahunt

[57] ABSTRACT

Apparatus for determining the extent to which a gaseous fluid is modified by a known material with the extent of such modification being measured with respect to an unacceptable level of modification such as the lower explosive limit for the modified gaseous fluid. Two chambers, each having an electric to acoustic transducer and an acoustic to electric transducer, are used with the acoustic to electric transducers connected in a bridge circuit. One chamber contains the gaseous fluid. It may be sealed in the chamber or received from a source where the gaseous fluid is not subject to modification by the known material. The other chamber receives the gaseous fluid from an area where it is subject to modification by the known material. A constant output oscillator having its frequency determined by the resonant frequency of the chamber receiving the unmodified gaseous fluid is used to energize the electric to acoustic transducers. The output of the bridge varies as the gaseous fluid is modified by the known material to provide an output signal which is measured relative to the output for the unacceptable level of modification of the gaseous fluid by said known material.

4 Claims, 1 Drawing Figure

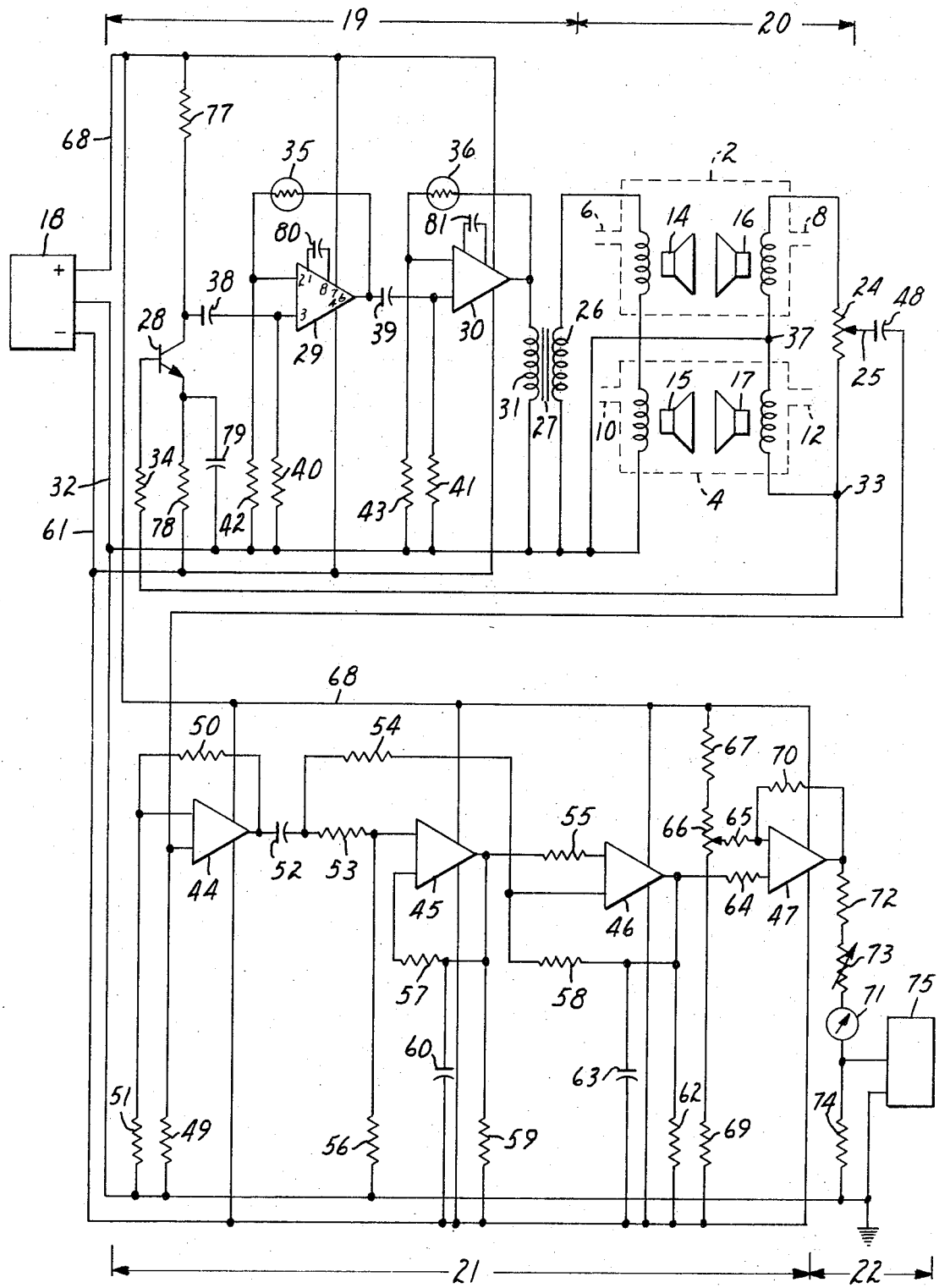

GASEOUS FLUID MONITORING APPARATUS

BACKGROUND OF THE INVENTION

This invention relates to apparatus for monitoring a gaseous fluid to determine the degree to which the gaseous fluid is modified by a known material relative to the unacceptable level of modification of the fluid by such known material and in particular to apparatus for monitoring a modified gaseous fluid relative to its lower explosive limit.

A gaseous fluid, such as air in a work, storage or manufacturing area, may be subject to contamination or modification by a material such as dust, heptane, carbone monoxide or some gaseous mixture. The modification may reach a level which is explosive, injurious to personnel or damaging to a process being carried out making it desirable to provide apparatus for monitoring the gaseous fluid to detect an undesirable level of modification. It is desirable that such apparatus be reliable, easily repaired and require a minimum of maintenance.

Many manufacturing processes must be monitored at one or more points to determine whether a gaseous fluid, subject to being modified by a known substance, is approaching or has reached its lower explosive limit. For example, a continuous web of tape may pass through a drying oven after receiving a coating. Heptane is given off which mixes with the air in the oven. If a sufficient amount of heptane is given off, an explosive mixture is presented. Hot wire and infrared type detectors can be used to monitor such a process. However, the hot wire type detector, which employs a platinum wire, is subject to being contaminated by various materials. One contaminant is silicone which is used extensively in manufacturing processes. Only a very small amount of silicone is needed to contaminate a hot wire detector. It has been known to contaminate hot wire type detectors in buildings as much as two blocks away from the silicone source. While not subject to contamination, infrared type detectors employ very complex electronics making them very expensive and difficult to maintain.

SUMMARY OF THE INVENTION

The apparatus of the instant invention for monitoring a gaseous fluid to determine its relationship relative to the unacceptable level of modification of the gaseous fluid by a known material uses acoustic techniques to provide an apparatus which is not subject to contamination and is relatively inexpensive and easily maintained. In addition, it can be readily calibrated to monitor any gaseous fluid which is subject to being modified by a known material. As used herein, a known material may be a single substance or mixture of one or more substances presented in some definite proportion.

The monitoring apparatus of the present invention includes two chambers. A first chamber contains the gaseous fluid. It may be sealed in the chamber or received from a source free of a known modifying material while a second chamber receives the gaseous fluid from an area where it is subject to modification by a known substance. Each chamber has an electric to acoustic transducer and an acoustic to electric transducer which are acoustically coupled with the degree of coupling in each chamber being influenced by the gaseous fluid presented to the chamber.

A constant output oscillator having its frequency determined by the resonant frequency of the first chamber is used to energize the two electric to acoustic transducers. The two acoustic to electric transducers are connected in a bridge circuit so that the output of the bridge varies as the gaseous fluid is modified by said known material. The output of the bridge is applied to a circuit which measures the output of the bridge relative to the output presented when the unacceptable limit for the modified gaseous fluid is reached.

Provision is made for connecting a recorder in the circuit connected to the output of the bridge so a visual record of the bridge output can be obtained, if desired, making it possible to detect a trend toward or away from the unacceptable level of modification. A meter, which may be calibrated in percent of the unacceptable limit, can be included in the circuit connected to the output of the bridge circuit to provide a perceptible indication of the bridge output relative to the unacceptable limit of modification.

Changes in the output of the acoustic to electric transducer of the second chamber with respect to the output of the acoustic to electric transducer of the first chamber that are not due to the known material are eliminated by having the frequency of the oscillator determined by the resonant frequency of the first chamber. This is accomplished by obtaining a signal which is proportional to the signal presented across the output of the acoustic to electric transducer in the first chamber and applying it to the input of the oscillator.

DRAWINGS

The single FIGURE, which is a schematic showing of the chambers used and the associated circuitry, illustrates the best mode of the invention presently contemplated.

DESCRIPTION

Referring to the drawing, the apparatus embodying the invention includes a first and second chamber, indicated by the dotted lines 4 and 2, respectively. The chambers are constructed alike and can be within a common housing (not shown). A common housing eliminates any error that would otherwise be introduced if the chambers were not at the same temperature. Each chamber has an inlet and an outlet permitting a gaseous fluid to be introduced into and pass through the chamber. The first chamber 4 has an inlet at 10 and an outlet at 12, and the second chamber 2 has an inlet 6 and an outlet 8.

Chamber 2 receives a portion of a gaseous medium from a point where it is subject to being modified by a known material while chamber 4 receives the gaseous fluid unmodified by the known material.

Electric to acoustic transducers 14 and 15 are positioned in the same manner within chambers 2 and 4, respectively, as are acoustic to electric transducers 16 and 17. The transducers are positioned so there is good acoustic coupling between transducers 14 and 16 and between 15 and 17. Small loudspeakers can be used for the transducers and all can be the same type. It is desirable that at least transducers 14 and 15 be the same and that transducers 16 and 17 be the same.

The loudspeakers used for the transducers 14-17 are selected on the basis of their cost, construction and size. Absorption by the transducers of any material contained in the gaseous fluid may influence the operation of the transducers. This can be avoided by using loudspeakers having all metal cones for transducers 14–17. The transducers should also be small in size so they can be readily mounted within a chamber having a volume small enough so only a short time is needed for a complete change to be made in the chamber of the gaseous fluid being sensed so that quick detection of a change in the gaseous fluid is possible. The volume of the chambers for the transducers is selected so the resonant frequency of the chamber for the gaseous fluid to be monitored will fall within the flat response curve for the loudspeaker selected.

The circuitry connecting with and including the transducers 14–17, inclusive, includes a power supply 18, a constant output oscillator 19, a bridge circuit 20 and circuitry 21 for detecting the bridge circuit output and rectifying it for use in operating a perceptible signal indicator circuit portion 22.

The acoustic to electric transducers 16 and 17 are connected in series, each providing one arm of the bridge circuit 20. The common connection 37 for transducers 16 and 17 is one output terminal for the bridge circuit 20 and it is connected to the common ground conductor 32.

The remaining two arms for the bridge circuit 20 are provided by a potentiometer 24 which is connected in parallel with the two series connected transducers 16 and 17. The movable contact 25 for the potentiometer provides the other output terminal for the bridge circuit.

The electric to acoustic transducers 14 and 15 are connected in series across the secondary winding 26 of the output transformer 27 for oscillator 19. Secondary winding 26 has one end connected to ground conductor 32. The transducers 14 and 15 can be considered a part of the bridge circuit 20 since an AC signal produced by the secondary winding 26 causes the transducers 14 and 15 to be energized to supply transducers 16 and 17 with acoustical energy which is transformed to electrical energy so an electrical output can be obtained from bridge circuit 20.

During calibration, the same gaseous fluid is supplied to chambers 2 and 4 while the potentiometer 24 is adjusted so the output of the bridge circuit 20 is at a desired reference level, preferably zero. Following calibration the apparatus is mounted for operation so the chamber 4 will receive the gaseous fluid while chamber 2 is connected to receive the gaseous fluid after being subject to change by a known material. Any change in the density of the gas presented to chamber 2 causes a change in the acoustic energy coupled between transducer 14 and 16. If a like change is not present in the gaseous fluid presented to chamber 4, the bridge circuit 20 will be unbalanced and an output signal will be present at the output terminals 25 and 37 which is determined by the degree of change in the density of the gaseous fluid presented to chamber 2.

The circuitry for the apparatus includes a number of operational amplifiers. To assist in the disclosure of the various connections made to the operational amplifiers, the standard designations used for the terminals of an operational amplifier are indicated on the symbol used to designate operational amplifier 29 which is a part of the oscillator 19 and are applicable to the other operational amplifiers. Each of the operational amplifiers require a negative voltage and a positive voltage which are available from the power supply 18 via conductors 61 and 68 respectively. Terminals 4 and 7 of each operational amplifier connect with conductors 61 and 68, respectively.

The oscillator circuit 19 includes an NPN type transistor 28 and operational amplifiers 29 and 30. The base of transistor 28 is connected via a resistor 34 to the connection 33 that is common to the transducer 17 and the potentiometer 24 to provide a feedback signal for the oscillator circuit 19 which is proportional to the electrical signal produced by the transducer 17. The collector electrode of transistor 28 is connected to the positive voltage conductor 68 via a resistor 77 while its emitter electrode is connected to the negative voltage conductor 61 via a resistor 78. A low impedance path between the emitter electrode and ground conductor 32 for the oscillator frequency is provided by a capacitor 79 to prevent a loss in the gain of the transistor 28. The output of the transistor 28 is obtained from its collector electrode and is applied to the input terminal 3 of operational amplifier 29 by the R-C coupling provided by capacitor 38 which is connected between the collector electrode and input terminal 3 of the amplifier and resistor 40 which is connected between input terminal 3 and ground. The output of operational amplifier 29 is applied to the input terminal 3 of operational amplifier 30 via a similar R-C coupling provided by capacitor 39 and resistor 41. The output terminal 6 for operational amplifier 30 is connected to ground via the primary winding 31 of transformer 27.

With the oscillator circuit 19 described, any acoustic signal present in the chamber 4 will cause transducer 17 to produce an AC signal which is fed back to the transistor 28 and amplified by amplifiers 29 and 30 to provide an AC signal to the primary winding 31 of transformer 27 to energize transducers 14 and 15 via the secondary winding 26. The acoustic output from transducer 15 is received by transducer 17 giving rise to a larger signal that is then fed back to the transistor 28. This regenerative action continues until the oscillator 19 is operating at the resonant frequency of the chamber 4 which is the frequency at which a maximum feedback signal is provided to transistor 28.

With the resonant frequency for chamber 4 selected to be within the flat portion of the frequency response of the transducers 14–17, the operation of the oscillator 19 at the resonant frequency of chamber 4 provides a stable input reference signal for the bridge circuit 20 for a given signal level received from the output of oscillator 19.

In order that the output of the bridge circuit 20 will not change due to a variation in the output provided by oscillator 19, the oscillator 19 is designed to provide an output signal having a constant amplitude. The constant output signal is provided by the use of thermistors 35 and 36 in the feedback circuits for operational amplifiers 29 and 30, respectively. The feedback circuit for amplifier 29 includes thermistor 35 connected between the output terminal 6 and the input terminal 2 and resistor 42 connected between input terminal 2 and the ground conductor 32. The feedback circuit for amplifier 30 is similarly connected and includes thermistor 36 and resistor 43. Thermistors 35 and 36 are self-heating so that an increase in the output of amplifiers 29 and 30 cause a decrease in the resistance presented by thermistors 35 and 36 to increase the signal being fed back to amplifiers 29 and 30. The signal fed back opposes the signal applied to the other input therminal 3 for the operational amplifiers causing the output from operational amplifier 30 to remain at a constant level.

Capacitors 80 and 81 are connected between terminals 1 and 8 of amplifiers 29 and 30, respectively. These capacitors are used to provide roll off for high frequencies to prevent the oscillator 19 from operating at an undesirable high frequency.

The circuit portion 21 for detecting the bridge circuit 20 output and rectifying it for use in providing a perceptible signal when applied to a circuit portion 22 includes operational amplifiers 44–47, inclusive. Operational amplifier 44 is used to amplify the output of the bridge circuit 20 while operational amplifiers 45 and 46 are connected in an absolute value rectifier circuit configuration. Operational amplifier 47 is used to amplify the rectified signal and has its output connected to the circuit portion 22.

The operational amplifier 44 is coupled to receive the output of the bridge circuit 20 via the R-C coupling provided by capacitor 48 and resistor 49. Capacitor 48 has one side connected to the adjustable contact 25 of potentiometer 24 and has its other side connected to one end of resistor 49 and the input terminal 3 of operational amplifier 44. The other end of resistor 49 is connected to the ground conductor 32. A feedback circuit which includes resistors 50 and 51 determines the signal presented at the other input terminal 2 of the operational amplifier 44. Resistor 50 is connected between the output terminal 6 and the input terminal 2 while resistor 51 is connected between input terminal 2 and the ground conductor 32.

When the bridge circuit 20 is unbalanced, the resulting AC signal output signal is amplified by the operational amplifier 44. The operational amplifiers 45 and 46 are connected so that the AC input signal to amplifier 45 is inverted and applied to one input of amplifier 46 which also responds to the signal at the output of amplifier 45 so that a full rectified signal is presented at the output of the amplifier 46. The output of operational amplifier 44 is coupled to the operational amplifier 45 and 46 via a capacitor 52. Resistors 53 and 56 are also used with capacitor 52 to determine the input to input terminal 2 of operational amplifier 45. Resistor 53 is connected between capacitor 52 and input 2, while resistor 56 is connected between input 2 and ground conductor 32. A resistor 54 is connected between the capacitor 52 and the input 3 of operational amplifier 46. Operational amplifier 46 in addition to receiving the output of operational amplifier 44 at input terminal 3 also receives the output of operational amplifier 45 which is connected to the input 2 of operational amplifier 46 via a resistor 55.

The operational amplifier 45 and 46 have similarly connected load circuits and feedback circuits. The resistors 57 and 58 connect between the output terminal 6 and the input terminal 3 of operational amplifiers 45 and 46, respectively, provide feedback to control the gain and coupling of the operational amplifiers. The load circuit for amplifier 45 includes a resistor 59 connected in parallel with the capacitor 60 with such combination connected between the output of operational amplifier 45 and the negative voltage output provided from power supply 18 on conductor 61. The output load for operational amplifier 46 is similarly connected and includes a resistor 62 and capacitor 63. The capacitor 60 and 63 serve to smooth out the DC signal presented at the output of amplifier 45 and amplifier 46.

While a conventional full wave rectifying bridge type circuit using diodes could be used instead of the amplifiers 45 and 46, a diode rectifying circuit does not provide rectified signal over the full range of unbalance of the bridge circuit 20 because of the voltage drop across the diodes. Were diode rectification used, the bridge circuit 20 would have to be unbalanced to the degree needed to overcome the diode drop before a DC measure of the unbalance is obtained. This is avoided by the rectifier circuit configuration using operational amplifiers 45 and 46 as described.

The output of operational amplifier 46 is amplified by operational amplifier 47. A resistor 64 connects the output terminal 6 of operational amplifier 46 with the input terminal 3 of operational amplifier 47. An adjustable voltage is applied to input terminal 2 of operational 47 via a resistor 65 which is connected between the movable connection to a potentiometer 66 and the input terminal 2 of operational amplifier 47. One end of the potentiometer 66 is connected to the positive voltage via a resistor 67 provided from power supply 18 on conductor 68 while the other end of potentiometer 66 is connected via a resistor 69 to the negative voltage provided on conductor 61 from the power supply 18. The feedback resistor 70 is connected between the output terminal 6 and the input terminal 2 of amplifier 47.

The output of amplifier 47 is a direct voltage signal which is used to drive the perceptible signal indicator circuit portion 22 which includes a DC meter 71. A resistor 72 connected in series with a variable resistor 73 connects the output terminal 6 of amplifier 47 to one side of the meter while a resistor 74 connects the other side of the meter 71 to the ground conductor 32. The variable resistor 73 is used for span adjustment. If desired, the signal developed across the resistor 74 can be used to provide an input signal to a recorder 75 shown connected in parallel with resistor 74.

Reference has already been made to the procedure for calibrating the bridge circuit 20 for balance or zero output when the same gaseous fluid is placed in both chambers 2 and 4. This can be done most readily by connecting an oscilloscope across the output terminals of 25 and 37 and adjusting the potentiometer 24. The meter 71 should also then read zero. The zero adjustment for meter 71 is made by via the potentiometer 66.

It is desirable that meter 71 be calibrated to read in percent of the unacceptable level of modification of the gaseous fluid by the known material. For example, if the gaseous fluid is air and the modifying material is heptane, a known mixture of air and heptane is prepared and placed in the chamber 2 while air is present in chamber 4. Assuming the unacceptable limit is the lower explosive limit for air and heptane and assuming the known mixture of air and heptane is 40% of the lower explosive limit of heptane and air, the variable resistor 73 is adjusted to read 40 percent of the full scale reading for meter 71 to complete the calibration of the apparatus. The apparatus is then ready for installation in a process where the gaseous fluid, air, is modified by heptane. This may occur, for example, in process used for applying a coating containing heptane to a continuous tape which passes through a drying oven. The apparatus can be used to sample the air and heptane mixture in the oven which is received in chamber 2 with the air for chamber 4 being obtained from a suitable source such as the compressed air supply generally found in a manufacturing facility.

The meter 71 provides a readily perceptive signal indicative of the unacceptable level of modification by a known material of the gas being monitored and also provides an indication that material modifying the gaseous fluid is present. For the process mentioned above, the presence of heptane would indicate that a coating is being applied to the tape. The recorder 75 provides a record of the monitoring process and therefore can be used to provide a visual indication of a trend toward or away from the unacceptable modification level of the modified gas.

Typical component types and values for use in the apparatus disclosed are listed below with the manufacturer or source enclosed in parentheses when applicable:

| Components | | Type or Value |
|---|---|---|
| Capacitors | 80, 81 | 3.3 pf |
| | 52 | 5600 pf |
| | 48 | .01 mfd |
| | 38, 39 | .27 mfd |
| | 60, 63, 79 | 6 mfd |
| Meter, D. C. | 71 | 0–100 Micro Amp |
| Operational Amplifiers | | |
| | 29, 30 | 748 (Fairchild) |
| | 44, 47 | 741 (Fairchild) |
| | 45, 46 | 749 (Fairchild) |
| Potentiometer | 66 | 50 ohm |
| | 24, 73 | 10K ohm |
| Resistors | 74 | 100 ohm |
| | 34, 40, 42, 77, 78 | 1K ohm |
| | 67, 69 | 1.2K ohm |
| | 49, 51, 59, 62 | 8.25K ohm |
| | 24, 73 | 10K |
| | 41, 43, 72 | 15K |
| | 70 | 23.7K ohm |
| | 55, 57 | 46.4K ohm |
| | 53, 54, 56, 58 | 100K ohm |
| | 50 | 698K ohm |
| Transformer | 27 | SO-10 (United Transformer) |
| Transistor | 28 | 2N3391 |
| Transducers | 14–17 | 10 ohm Speakers (TDH-39 Headset, Telephonics) |
| Thermistors | 35, 36 | BA51V3R, 100 ohm, 25°C (Fenwall) |

What is claimed is:

1. Apparatus for detecting the modification of a gaseous fluid by a known material including a first chamber for receiving the gaseous fluid;

a second chamber for receiving the gaseous fluid from an area where it is subject to being modified by a known material;

a first and second transducer positioned in each of said first and second acoustic chambers, said first transducer being an electric to acoustic transducer and said second transducer being an acoustic to electric transducer;

an oscillator connected for energizing said first transducers with a signal having a frequency that is equal to the resonant frequency of said first chamber;

a bridge circuit including said second transducers, said bridge circuit being energized by the acoustic energy received by said second transducers from said first transducers, the acoustic energy received by said second transducer of said second acoustic chamber varying with the modification of the gaseous fluid by the known material;

a feedback circuit connected between said bridge circuit and said oscillator for providing said oscillator with an electrical signal proportional to the electrical signal output of said second transducer for said first chamber causing said oscillator to operate at the resonant frequency of said first chamber; and means connected to the output of said bridge circuit and responsive thereto for providing a signal indicative of the modification of the gaseous fluid by the known substance.

2. An apparatus for detecting the modification of a gaseous fluid by a known material including a first chamber for receiving the gaseous fluid;

a second chamber for receiving the gaseous fluid from an area where it is subject to being modified by a known material;

a first and second transducer positioned in each of said first and second acoustic chambers, said first transducer being an electric to acoustic transducer and said second transducer being an acoustic to electric transducer;

a constant output oscillator connected for energizing said first transducers with a signal having a frequency that is equal to the resonant frequency of said first chamber; said oscillator including an amplifier which has a degenerative feedback circuit connected between the output and input of said amplifier to help maintain the output of said oscillator constant;

a bridge circuit including said second transducers, said bridge circuit being energized by the acoustic energy received by said second transducers from said first transducers, the acoustic energy received by said second transducer of said second acoustic chamber varying with the modification of the gaseous fluid by the known material; and means connected to the output of said bridge circuit and responsive thereto for providing a signal indicative of the modification of the gaseous fluid by the known substance.

3. An apparatus in accordance with claim 2 wherein said degenerative feedback circuit includes a thermistor heated by the current in said feedback circuit.

4. An apparatus for detecting the modification of a gaseous fluid by a known material including a first chamber for receiving the gaseous fluid;

a second chamber for receiving the gaseous fluid from an area where it is subject to being modified by a known material;

a first and second transducer positioned in each of said first and second acoustic chambers, said first transducer being an electric to acoustic transducer and said second transducer being an acoustic to electric transducer;

an oscillator connected for energizing said first transducers with a signal having a frequency that is equal to the resonant frequency of said first chamber;

a bridge circuit including said second transducers, said bridge circuit being energized by the acoustic energy received by said second transducers from said first transducers, the acoustic energy received by said second transducer of said second acoustic chamber varying with the modification of the gaseous fluid by the known material; and means connected to the output of said bridge circuit and responsive thereto for providing a signal indicative of the modification of the gaseous fluid by the known substance, said means including two operational amplifiers connected for providing full-wave rectification of the bridge circuit output.

* * * * *